Figure 1:
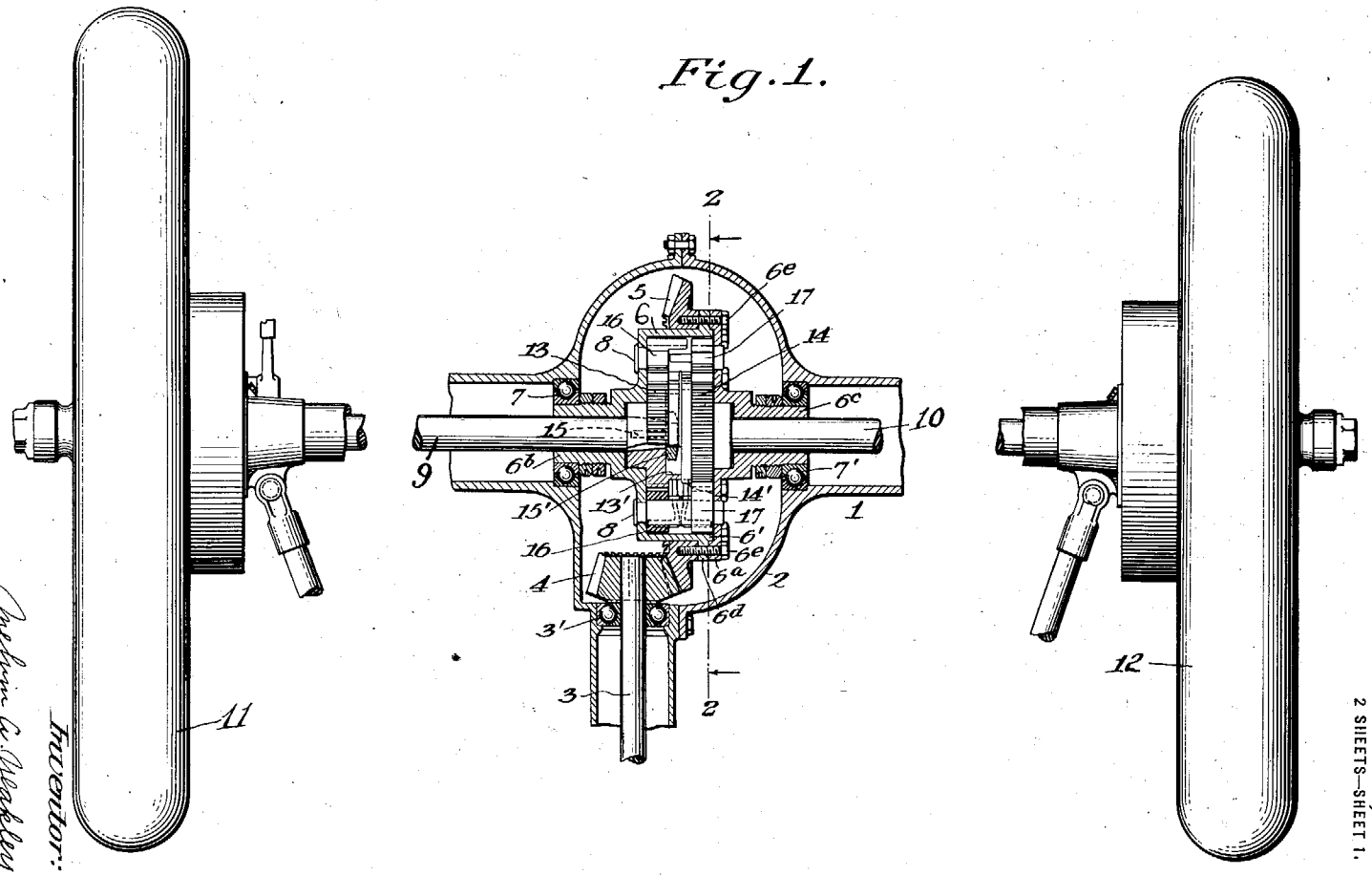

M. A. YEAKLEY.

POWER TRANSMITTING MECHANISM.

APPLICATION FILED MAR. 2, 1916.

Reissued May 2, 1916.

14,126.

2 SHEETS—SHEET 1.

Inventor:

Melvin A. Yeakley

M. A. YEAKLEY.
POWER TRANSMITTING MECHANISM.
APPLICATION FILED MAR. 2, 1916.
Reissued May 2, 1916.
14,126.
2 SHEETS—SHEET 2.
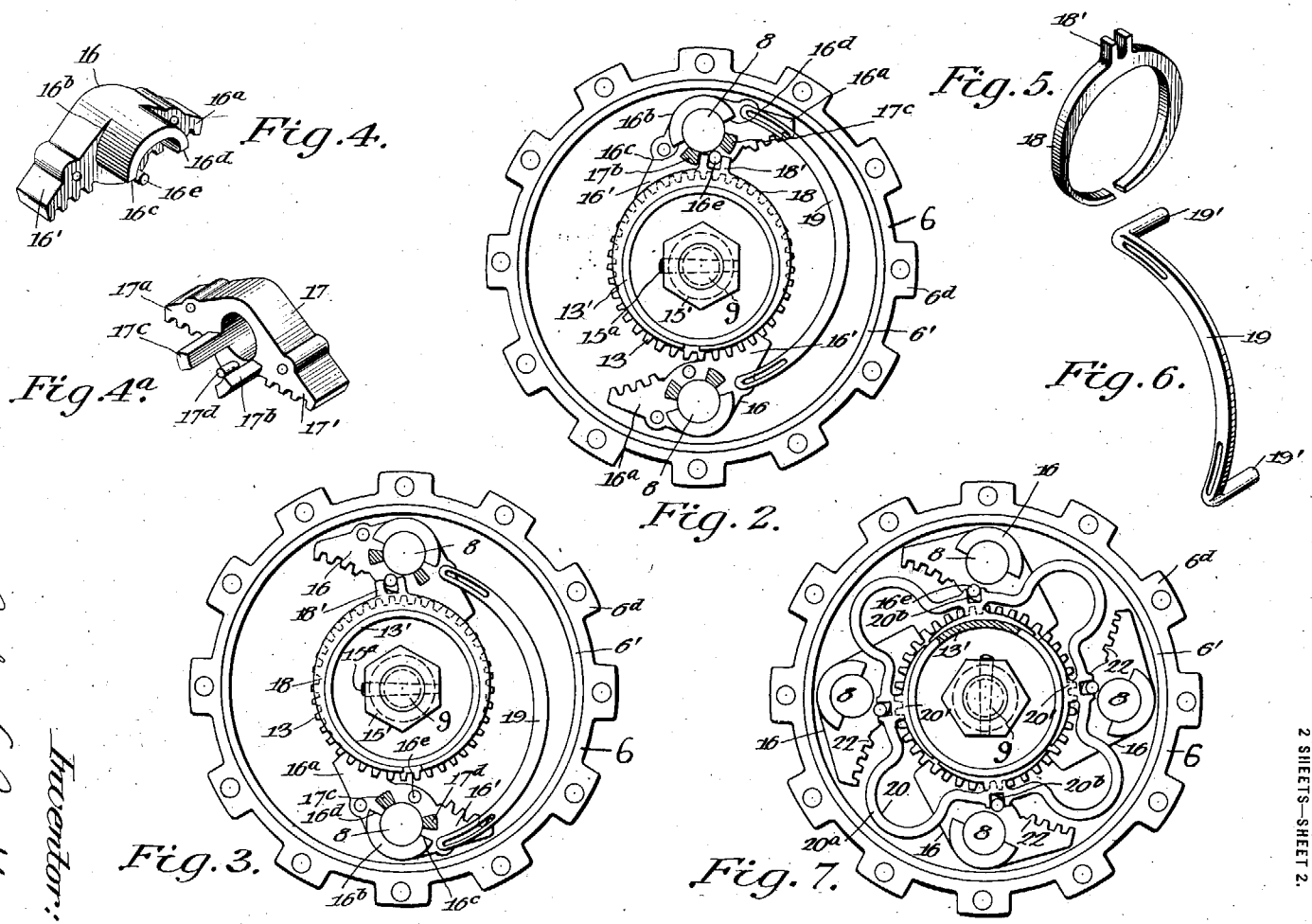
Inventor:
Melvin A. Yeakley

UNITED STATES PATENT OFFICE.

MELVIN A. YEAKLEY, OF CANTON, OHIO.

POWER-TRANSMITTING MECHANISM.

14,126. Specification of Reissued Letters Patent. Reissued May 2, 1916.

Original application filed September 17, 1910, Serial No. 582,524. Renewed November 23, 1914, Serial No. 873,636. Original No. 1,145,451, dated July 6, 1915. Application for reissue filed March 2, 1916. Serial No. 81,756.

*To all whom it may concern:*

Be it known that I, MELVIN A. YEAKLEY, a citizen of the United States, residing at Canton, in the county of Stark and State of Ohio, have invented certain new and useful Improvements in and Relating to Power-Transmitting Mechanism, of which the following is a specification.

This invention relates to power transmitting devices, more particularly to differential mechanism of the class adapted to transmit power to the driving wheels of a motor vehicle which rotate about a common axis, in such manner as to cause the power to be delivered, to both wheels under certain conditions, to rotate them for either forward or backward running; again, permit either wheel automatically and freely to over-run the other, and also permit retarding or braking action to be effected through the said power transmitting mechanism itself, when desirable or necessary.

Devices embodying my invention may be so constructed as to readily replace differential or compensating gear mechanism in automobiles, motor vehicles or traction engines, as now in general use, without alteration of the other parts of the axle and power transmitting mechanisms.

For the purpose of illustration I have shown in the accompanying drawings one design of power transmitting device embodying my invention.

Figure 1 is a view of one well known type of rear axle construction for an automobile including driving wheels, provided with a power transmitting device embodying my invention, parts being broken away, and others shown in section. Fig. 2 is a section on the line 2—2 of Fig. 1, with the parts arranged for forward rotation. Fig. 3 is a section on same line as Fig. 2, but with the parts arranged for backward rotation. Fig. 4 is a perspective view of one of the interlocking pawl members detached. Fig. 4ª is a perspective view of another interlocking pawl member, detached. Fig. 5 is a perspective view on one of the friction rings detached. Fig. 6 is a perspective view of one of the connecting links detached. Fig. 7 illustrates a modification of my invention.

In the drawings, 1 indicates the axle housing as an entirety, it having an enlarged central portion 2 adapted to receive the differential and driving mechanism. This housing may be constructed in any well known manner. I have merely shown the enlarged central portion 2 as formed in sections separable on the central, vertical, longitudinal line of the axis of the propeller or drive shaft 3 which is suitably journaled in a bearing 3′ at the front end of the said enlarged housing portion 2.

4 is a bevel drive pinion secured to the end of the propeller shaft 3 within the housing enlargement 2. It meshes with a bevel gear 5.

6 is a casing member comprising a cup shaped part 6′ and an end plate 6ª. The cup shaped part 6′ of the casing member carries a lateral tubular extension 6ᵇ suitably journaled in the axle housing, as indicated at 7, and the end plate 6ª has a lateral tubular extension 6ᶜ, suitably journaled in the axle housing as indicated at 7′.

8 are transverse shafts or pins, each having one end connected with the end plate 6ª and its opposite end connected with the vertical wall of the cup shaped part 6′. This cup shaped part carries an annular flange 6ᵈ. 6ᵉ are bolts connecting the bevel gear 5, plate 6ª and annular flange 6ᵈ together.

9 and 10 indicate the driven rear axle sections axially alined, and suitably mounted in the rear axle housing. To their outer ends, respectively, these shaft sections have secured the drive wheels 11 and 12. At their inner adjacent ends, within the housing enlargement 2, each has secured to it, in any suitable manner, a toothed, notched or ratchet wheel, as indicated at 13 and 14, respectively. For the purpose of illustration I have shown the connection between each of such toothed or ratchet wheels and its corresponding axle section as by means of a key 15, nut 15′ and pin 15ª.

16 are pawl members, and one or more of which, as desired, may be used, each loosely mounted on one of the shafts 8 and having the forward drive pawl 16′ and rearward drive pawl 16ª, each arranged for independent engagement with the ratchet wheel 13. These drive pawls may each have one or more teeth for ratchet engaging purposes.

In the device illustrated each pawl has four such teeth. 17 are similar pawl members, each loosely mounted on one of the shafts 8 and having a forward drive pawl 17′ and rearward drive pawl $17^a$, and each arranged for independent engagement with the ratchet wheel 14. At its inner side each pawl member 16 carries an inwardly extending curvilinear lug or projection $16^b$ providing interlocking surfaces $16^c$, $16^d$ at its opposite ends.

$16^e$ is an operating stud or lug carried by the member 16. Each pawl member 17 has a pair of inwardly extending lugs or interlocking stops $17^b$, $17^c$ and an operating stud or lug $17^d$. These stops $17^b$, $17^c$ are shaped and proportioned to lie in the plane of the coöperating interlocking lug $16^b$ on the adjacent pawl member 16 and to permit certain relative movement of the pawl members to each other before the interlocking member $16^b$ will engage with either of the stops $17^b$, $17^c$, on the pawl member 17.

Each of the ratchet wheels 13 and 14 carries an inwardly turned base or shoulder, as indicated at 13′, 14′, respectively, upon which is mounted a friction member or yoke 18 having a recessed extension 18′ to receive the adjacent operating lug $16^e$, $17^d$, as the case may be. Where more than one pair of interlocking pawl members 16, 17 is used, I have found it beneficial to interconnect them, so that the corresponding pawls of each pair will operate simultaneously. In the drawings in Figs. 1 to 3 and 6 are shown links 19 preferably of resilient material for this purpose. Each link at either end has a lateral extension 19′ which enters a corresponding aperture in the adjacent pawl. The resiliency of the links accommodates for any slight irregularities of engagement of the connected pawls respectively with the teeth of the adjacent ratchet wheel.

In Fig. 7 I have illustrated the use of four pairs of pawl members, and a single friction member 20 for simultaneously operating all of the corresponding pawls of each pair. Such friction member 20 may be formed with separated shoes 20′ for engagement with the friction shoulder on the ratchet wheel, and interconnecting resilient loops $20^a$. Connection with the pawl members may be effected as before described by recesses in the friction member, as indicated at $20^b$, and the operating lugs on the pawl members.

It may be found advisable to make the first teeth at either end of the pawls to engage the ratchet on all but one of the connected pawls of a series, slightly shorter than the others, so that when the one first perfect lead tooth on the pawl with perfect teeth goes into place the other shorter first teeth on the remaining pawls of the series will find their proper places simultaneously and will not engage with and remain engaged with top surfaces of any of the teeth of the ratchet wheel. This is illustrated in Fig. 7, teeth 22 being shorter than the others.

In operation, assuming the driven wheels are running straight ahead on a smooth level surface, power is transmitted from the propeller shaft 3 and bevel pinion 4 to the bevel gear 5 with which the casing 6 and pawl carrying shafts 8 rotate. When the power is first applied the resistance to turning of the driven or traction wheels 11 and 12 is sufficient to cause the ratchet wheels 13 and 14, to momentarily lag; this tendency to lag will be likewise incident to the friction members 18 on each ratchet wheel which will serve to rock or swing the forward drive pawls 16′ and 17′ into engagement with the ratchet wheels 13 and 14, respectively, and power will be transmitted to both of the driven wheels 11 and 12. Assuming now that while running forward a turn is made to the right, it will be necessary for the wheel 12 to rotate more rapidly than the wheel 11. In other words, it is desirable that this wheel 12 should overrun the wheel 11 and that power shall at the same time be transmitted from the propeller shaft 3 to the wheel 11 which is rotating more slowly than the then outside wheel 12. My differential mechanism under such circumstances automatically accommodates itself to the requirements, for as soon as it is necessary for the outside wheel, in this instance driven wheel 12, to run faster than the inside wheel, there will be a tendency of the ratchet wheel 14 to run faster than the bevel gear 5 and other elements of the intermediate transmitter through which power is being transmitted to the driven wheel 11. Co-incident with this faster running or overrunning of the then-outside wheel 12 and the ratchet wheel 14 connected therewith, the friction element 18 associated with the ratchet wheel 14 will swing the pawl members 17 so as to remove the forward drive pawls 17′ from the path of the ratchet teeth on the wheel 14. Such action of the friction element 18 is prevented from throwing the rearward drive pawls $17^a$ into the path of the ratchet teeth on the wheel 14, because of the engagement of the stop $17^b$ on the pawl element 17 with the surface $16^c$ of interlocking member $16^b$ on the pawl member 16. The forward drive pawl 16′ on this latter pawl member is in driving engagement with the ratchet wheel 13 and is transmitting power thereto. Under such conditions, therefore, the pawl element 17 is held neutral and inoperative for power transmitting purposes relative to the ratchet wheel 14, and consequently, the then-outside wheel 12 is permitted to overrun the inside wheel 11 to any required degree. It will be noted that as soon as the vehicle is turned to run straight again, the speed of rotation of the wheel 12 drops below that of the transmitter, there will be an interval during which the transmitter starts to overrun the ratchet wheel 14, and during this interval of relative movement between the transmitter and the ratchet wheel 14, the friction element 18 on the wheel 14 coöperating with the pawl member 17 will effect the movement of the forward driving pawl 17′ into operative driving relation to the ratchet wheel 14, so as to cause said ratchet wheel 14 to be rotated positively with said transmitter. It will be understood that in the event a corner is being turned in the opposite direction to that just described, the pawl member 16 will be thrown out of driving engagement with the ratchet wheel 13, and will be held in neutral position by engagement of its inwardly extending interlocking projection $16^b$ with one stop $17^b$ or $17^c$, as the case may be, on the pawl member 17, thus permitting the then-outside wheel 11 to overrun to any necessary extent the inside wheel 12 which is receiving power.

It will be understood that when it is desired to reverse the direction of the rotation of the driven wheels 11 and 12, by means of reversing the direction of rotation of the propeller shaft 3, my differential mechanism will automatically accommodate and adjust itself to the required conditions of relationship of its constituent parts, the friction members 18 operating to throw the pawls $16^a$ and $17^a$ into engagement with the teeth of the ratchet wheels 13 and 14 so as to transmit reverse direction of rotation to the traction wheels. It will be understood that when reversing, either wheel may overrun the other in going around a curve, the same as that above described for running forward, the functions and operations of the parts being such as to automatically accommodate themselves to the necessary conditions.

In the event that it is desired to apply a brake or retarding influence to the driven wheels through the power transmitting devices heretofore described, it will be readily observed that they will automatically and immediately accommodate themselves for such purposes. Assuming, for example, that the traction wheels 11 and 12 are rotating so as to propel the device forward, and a brake or retarding influence is exerted through the propeller shaft 3, as the speed of this shaft is slowed down, the speed of rotation of the bevel gear 5 is instantly affected, and the ratchet wheels 13 and 14 will start to overrun the bevel gear 5, whereupon the friction elements 18 will instantly operate to throw in the backing pawls $16^a$ and $17^a$ into engagement with the ratchet wheels 13 and 14 and thereby cause substantially the instantaneous application of the retarding or braking influence to the forward direction of rotation of the driven wheels 11 and 12. It will be understood that this same operation will occur in the event that the driving wheels both overrun the speed of the propeller shaft 3 at any time during the operation of the mechanism illustrated in the drawings. This being the case, in a motor vehicle the resistance of the motor to the over-running of the traction wheels may be employed in slowing down such traction wheels when descending a grade.

It will be understood that neither of the double pawls nor series thereof can be reversed in driving operation or retarding operation independently of the other, in such instance each being dependent upon the other because of the coöperative relation between them, effected by the interlocking or inter-engaging devices carried by them.

It will be understood that the necessary throw of the pawl members 16 and 17 in order to bring their forward or rearward drive pawls into or out of engagement with their respective ratchet wheels, may be increased or decreased according to the size or the ratchet teeth. As a matter of fact, the length of travel or throw of the double pawls in either direction may be made very short, so as to insure that there will practically be no back lash or sudden jar in the operation of the mechanism under any circumstances or conditions.

It will be understood that devices embodying my invention may be employed on jack shafts or counter-shafts and elsewhere where differential power transmitting devices of the class are required, as well as in such embodiments as illustrated in the drawings. To those skilled in the art to which this class of mechanism relates it will be apparent that the scope and spirit of my invention may be embodied in various adaptations.

When any power is transmitted through the device, the power transmitting elements through which it is transmitted are in positive engagement each with the next in the train. The parts are all simple and cheap to construct, may be made very durable and are not affected in their operation by metallic dust and the like which may collect in the differential housing chamber 2, and be distributed through or over the differential mechanism therein by the oil or lubricant which is usually employed for lubricating such parts.

It is thought that it will add to the clearness of this specification and the claims to state that, in the claims where the words, driven members or toothed or notched driven members, are employed, is meant the elements 13 and 14 on the alined shafts 9 and 10, while by the term "intermediate transmitter" is meant the driven or ring gear 5 and all elements which always rotate with it in either direction, including the parts for supporting the double pawl elements, but not said pawl elements themselves.

What I claim is:—

1. In mechanism of the class described, the combination of driven members, an intermediate transmitter, and engaging and disengaging elements carried by said transmitter, interposed between it and said driven members, and each adapted independently and positively to engage one of said driven members and apply power simultaneously to said driven members, or permit either of said driven members to overrun the other, said engaging and disengaging elements having interlocking connections between them whereby each is held out of engagement with the driven member with which it coöperates when one of said driven members overruns the intermediate transmitter and the other driven member is receiving power from said intermediate transmitter.

2. In mechanism of the class described, the combination of driven members, an intermediate transmitter, and means connected with said intermediate transmitter for transmitting power to each of said driven members simultaneously, while allowing either of said driven members to overrun the other, said means having interlocking parts so correlated that the power transmitting connections from said intermediate transmitter to a driven member is held out of engagement with the driven member with which it is adapted to coöperate by the corresponding means for transmitting power to the other driven member during such overrunning.

3. In mechanism of the class described, the combination of an intermediate transmitter including a driven gear, driven members, and engaging and disengaging devices between said intermediate transmitter and the driven members operating to transmit power in either direction, at the same time to both of said driven members or permit either one of the said driven members to overrun the other, the said engaging and disengaging devices having coöperating interlocking parts serving to hold out of engagement and in neutral position the engaging element for either driven member when either said driven member is overrunning the other in either direction.

4. In mechanism of the class described, the combination of an intermediate transmitter, driven members, each independent of the other, and interlocked positive engaging and disengaging devices interposed between said intermediate transmitter and said driven members, the interlocking of the engaging and disengaging devices serving to hold either of said devices out of power transmitting relation to its respective driven member when the latter is overrunning the other driven member.

5. In mechanism of the class described, the combination of an intermediate transmitter, driven members, each independent of the other, interlocked engaging and disengaging devices interposed between said intermediate transmitter and said driven members, the interlocking of the engaging and disengaging devices serving to hold either of said devices out of power transmitting relation to its respective driven member when the latter is overrunning the other driven member, and friction controlled means for operating said engaging and disengaging devices.

6. In mechanism of the class described, the combination of an intermediate transmitter, driven members, each independent of the other, and engaging and disengaging devices interposed between and adapted to establish positive connection between the intermediate transmitter and the driven members, and operating to transmit power in either direction at the same time to both of said driven members, or permit either one of said driven members to overrun the other entirely free from contact or engagement with either of said engaging and disengaging devices.

7. In mechanism of the class described, the combination of an intermediate transmitter, driven members, each independent of the other, engaging and disengaging devices interposed between and adapted to establish positive connection between the intermediate transmitter and the driven members, and operating to transmit power in either direction at the same time to both of said driven members, or permit either one of said driven members to overrun the other, and independent friction operated means for actuating each of said engaging and disengaging devices.

8. In mechanism of the class described, the combination of an intermediate transmitter, driven members each independent of the other, a pair of pawl members, each of said pawl members interposed between said intermediate transmitter and one of said driven members and having an interlocking connection with the other pawl member to limit relative movements of said pawl members and means for actuating said pawl members.

9. In mechanism of the class described, the combination of an intermediate transmitter, driven members each independent of the other, a pair of interlocked pawl members, each of said pawl members interposed between said intermediate transmitter and one of said driven members, and friction controlled means for operating said pawl members.

10. In mechanism of the class described, the combination of an intermediate transmitter, driven members each independent of the other, a pair of interlocked pawl members, each of said pawl members interposed between said intermediate transmitter and one of said driven members, and independent friction controlled means carried by said driven members for actuating said pawl members, respectively.

11. In mechanism of the class described, the combination of an intermediate transmitter, driven members, each independent of the other, a pair of double acting pawl members, each of said pawl members interposed between said intermediate transmitter and one of said driven members, and having an interlocking connection with the other pawl member to limit relative movement of said pawl members and friction controlled means for actuating said double pawl members.

12. In mechanism of the class described, the combination of an intermediate transmitter, driven members each independent of the other, and positive acting engaging and disengaging devices interposed between said intermediate transmitter and each of said driven members and including means for holding either of said engaging and disengaging devices free from engagement with the driven member with which it is adapted to coöperate to permit entirely free overrunning of its driven member while the other of said engaging and disengaging devices is positively transmitting power to the other driven member.

13. In mechanism of the class described, the combination of an intermediate transmitter, driven members each independent of the other, positive acting engaging and disengaging devices interposed between said intermediate transmitter and each of said driven members and including means for holding either of said engaging and disengaging devices out of engagement with the driven member with which it is adapted to coöperate to permit the noiseless overrunning of its driven member while the other of said engaging and disengaging devices is positively transmitting power to the other driven member, and friction controlled means for actuating said engaging and disengaging devices.

14. In mechanism of the class described, the combination of an intermediate transmitter, driven members each independent of the other, and engaging and disengaging devices for positively operating each driven member in either direction interposed between said intermediate transmitter and each of said driven members, and including means for holding either of said engaging and disengaging devices out of engagement with the driven member with which it is adapted to coöperate to permit the free overrunning of its driven member while the other of said engaging and disengaging devices is positively transmitting power to the other driven member.

15. In mechanism of the class described, the combination of an intermediate transmitter, driven members, each independent of the other, a shaft carried by said intermediate transmitter, a pair of double acting pawls each loosely mounted on said shaft and adapted to engage with and be disengaged from one of said driven members, respectively, and each carrying an interlocking member disposed to engage with a corresponding interlocking member on the other pawl to limit the relative movement of the pawls to each other, and means for moving said pawls into and out of engagement with their respective driven members.

16. In mechanism of the class described, the combination of an intermediate transmitter, toothed driven members each independent of the other, a pair of pawls, each interposed between said intermediate transmitter and one of said toothed members, means for holding either of said pawls free from engagement with the toothed member with which it is adapted to coöperate to permit entirely free over-running of said toothed member while the other of said pawls is positively transmitting power to the other toothed member, and means for moving said pawls into and out of engagement with their respective toothed members.

17. In mechanism of the class described, the combination of an intermediate transmitter, toothed driven members each independent of the other, a pair of pawls, each interposed between said intermediate transmitter and one of said toothed members, means for holding either of said pawls free from engagement with the toothed member with which it is adapted to coöperate to permit entirely free over-running of either of said toothed members while the other of said pawls is positively transmitting power to the other toothed member, and means actuated by said toothed driven members for moving said pawls into and out of engagement with said toothed members, respectively.

18. In mechanism of the class described, the combination of an intermediate transmitter, toothed driven members each independent of the other, and positive acting engaging and disengaging devices interposed between said intermediate transmitter and each of said toothed members and including means for moving and holding either of said engaging and disengaging devices free from engagement with the toothed member with which it is adapted to coöperate to permit entirely free over-running of its toothed member while the other of said engaging and disengaging devices is positively transmitting power to the other toothed member.

19. In differential mechanism, the combination of an intermediate transmitter, driven members, double-acting engaging and disengaging elements carried by said transmitter and each adapted to engage and disengage one of said driven members, respectively, and means operated by said driven members for effecting the engagement of each of said engaging and disengaging elements with said driven member with which it coöperates.

20. In differential mechanism, the combination of an intermediate transmitter, driven members, double-acting engaging and disengaging elements carried by said transmitter and each adapted to engage and disengage one of said driven members, respectively, and means operated by said driven members for effecting the engaging and disengaging of each of said engaging and disengaging elements with said driven member with which it coöperates.

21. In differential mechanism, the combination of an intermediate transmitter, a pair of toothed driven members, pawls carried by said transmitter adapted to drive each of said toothed driven members in either direction, respectively, and means operated by said toothed driven members for noiselessly tilting said pawls into or out of path of the teeth of either of said toothed driven members.

22. In differential mechanism, the combination of an intermediate transmitter, a pair of toothed driven members, sets of pawls, each carried by said transmitter and adapted to drive one of said toothed driven members, respectively, in either direction, means operated by each of said toothed driven members to move one of said sets of pawls into and out of driving relation with its driven member, respectively, and controlling means adapted to hold the non-driving set of pawls from reversing while the other set is driving.

23. In differential mechanism, the combination of an intermediate transmitter, a pair of toothed driven members, a pair of double pointed pawls, friction rings, one supported on each toothed driven member and connected with one of said double pointed pawls, and pawl limiting means extending from one double pointed pawl to the other.

24. In differential mechanism, a pair of double pointed pawls, means for moving said pawls in opposite directions into and out of forward and reverse driving positions, and means interposed between said pawls and adapted to limit the movement of either of them by the position of the other.

25. In mechanism of the class described, a right and left set of driving and reversing pawls, friction means for independently moving the pawls of each set into and out of forward and reverse driving positions, and means interposed between the pawls of each set adapted to limit the movement of pawls of one set by the position of pawls of the other set.

26. In mechanism of the class described, the combination of an intermediate transmitter, toothed driven members, positive engaging and disengaging elements coöperatively interposed between each of said toothed driven members and said transmitter and each adapted to engage one of said toothed driven members, respectively, to drive it in either direction, means for throwing said engaging and disengaging elements into operative relation with said toothed driven members, and controlling means interposed between said engaging and disengaging elements and adapted to hold either of them from being reversed while the other is driving.

27. In mechanism of the class described, the combination of an intermediate transmitter, two toothed driven members, sets of pawls carried by said transmitter, each set adapted to drive one of said driven members in either direction and arranged so that said pawls will be in neutral position at midway between forward and reverse driving position, pawl operating means, and pawl controlling means extending from one set of pawls to the other and adapted to hold either set from being reversed while the other set is driving.

28. In differential mechanism, the combination of a driven casing, right and left driven members mounted in said casing, a pawl shaft supported in said casing, right and left double-acting pawls journaled on said pawl shaft and arranged to engage and drive their respective right and left driven members in either direction, right and left friction rings frictionally mounted on their respective right and left driven members and having operative connections to their respective right and left double-acting pawls, and pawl limiting stops on each right and left double-acting pawl, coacting and arranged so as to limit the movement of either right and left double-acting pawl by the position of the other.

29. In mechanism of the class described, the combination of a transmitting casing, adapted to be power driven, a pair of driven members independently and rotatably mounted in said casing, and means interposed between and actuated by relative movement between said casing and driven members for making both forward and rearward positive driving connections between said casing and said driven members and for permitting either said driven member to overrun the other and the casing, as conditions require.

30. In mechanism of the class described, the combination of a transmitting casing, adapted to be power driven, a pair of notched driven members independently and rotatably mounted in said casing, and means including pawls interposed between and actuated by relative movement between said casing and driven members for making both forward and rearward positive driving connections between said casing and said driven members and for permitting either said driven member to overrun the other and the casing, as conditions require.

31. In mechanism of the class described, the combination of a transmitting casing, adapted to be power driven, a pair of notched driven members independently and rotatably mounted in said casing, and means including forward and rearward driving pawls interposed between and actuated by relative movement between said casing and driven members for making positive driving connections between said casing and said driven members, and for permitting either said driven member to overrun the other and said casing, as conditions may require.

32. In mechanism of the class described, the combination of a transmitting casing, adapted to be power driven, a pair of notched driven members, independently and rotatably mounted in said casing, and means including forward and rearward driving pawls interposed between and actuated by relative movement between said casing and driven members for making positive driving connections between said casing and said driven members and for permitting either of said driven members to overrun within said casing the other driven member, while the latter is being positively driven by said casing.

33. In mechanism of the class described, the combination of a transmitting casing, adapted to be power driven, a pair of notched driven members, independently and rotatably mounted in said casing, and means including forward and rearward driving pawls interposed between and actuated by relative movement between said casing and driven members for making positive driving connections between said casing and driven members for causing said driven members to rotate in forward and rearward direction with said casing, for permitting both driven members to turn in the same direction relative to said casing, to reverse the direction of drive between said casing and driven members, and for permitting either of said driven members to overrun the other and said casing, as conditions require.

34. In mechanism of the class described, the combination of a pair of pawl members, each having a forward and rearward driving pawl, a rotatable power transmitting casing in which said pawl members are mounted, and a pair of notched driven members independently mounted in said casing and so interconnected with said pawl members that the movement of said pawl members into operative driving relation with said notched driven members is effected by relative movement between said casing and driven members.

35. In mechanism of the class described, the combination of a pair of pawl members, each having a forward and rearward driving pawl, a rotatable power transmitting casing in which said pawl members are mounted, and a pair of notched driven members independently mounted in said casing and connected with said pawl members in such manner that the movement of each pawl member into operative driving relation with one of said driven members is effected by relative movement between said casing and one of said driven members.

36. In mechanism of the class described, the combination of forward and rearward driving pawls, a rotatable casing in which said pawls are mounted and through which power is transmitted to said pawls, and a pair of notched driven members mounted in said casing and having connections with said pawls for controlling the movement of each of said pawls into both forward and rearward operative driving relation with said notched driven members by relative movement between said casing and one of said driven members.

37. In mechanism of the class described, the combination of forward and rearward driving pawls, a rotatable casing in which said pawls are mounted and through which power is transmitted to said pawls, and a pair of notched driven members mounted in said casing and having connections with said pawls for controlling the movement of each of said pawls into and out of both forward and rearward operative driving relation with said notched driven members by relative movement between said casing and one of said driven members.

38. In mechanism of the class described, the combination of a pair of forward and a pair of rearward driving pawls, a rotatable casing in which said pawls are mounted and through which power is transmitted to said pawls, and a pair of notched driven members mounted in said casing and having connections with said pawls for controlling the movement of each of said pawls into both forward and rearward operative driving relation with said notched driven members by relative movement between said casing and one of said driven members.

39. In mechanism of the class described, the combination of a pair of pawl members, each having a forward and a rearward driving pawl, a rotatable casing in which said pawl members are independently mounted and through which power is transmitted to said pawl members, and a pair of notched driven members mounted in said casing and having connections with said pawl members for controlling the movement of said pawl members to establish operative driving relation between said driving pawls and notched driven members by relative movement between said casing and said driven members.

40. In mechanism of the class described, the combination of an intermediate transmitter, a pair of notched driven members, each mounted independently of the other and at opposite sides of said intermediate transmitter, multiple notched engaging elements interposed between said intermediate transmitter and said notched driven members and adapted to make forward and rearward driving connections between said parts, means coöperative with said intermediate transmitter, notched driven members and engaging elements adapted to operate the said notched engaging elements into and out of engagement with said notched driven members, for driving in either direction, and a means to control said notched engaging elements, whereby the notched engaging elements for either said driven member hold the notched engaging elements for the other said driven member from being reversed, when driving in either direction, as conditions require.

41. In mechanism of the class described, the combination of a casing, a pair of notched driven members, each independent of the other, engaging and disengaging elements, each adapted to engage one of said notched driven members, respectively, and operating means adapted to move silently each of said engaging and disengaging elements into and out of driving relation with said notched driven member with which it coöperates, when driving in either direction.

42. In mechanism of the class described, the combination of an intermediate transmitter, a pair of notched driven members rotatably mounted with respect to said intermediate transmitter, a pair of double pawls interposed between said intermediate transmitter and said notched driven members adapted to make positive forward and reverse driving connections between said intermediate transmitter and notched driven members and coöperatively arranged so that relative rotative movement between said intermediate transmitter and notched driven members operates said pawls into and out of positive driving relation with said notched driven members.

43. In mechanism of the class described, the combination of an intermediate transmitter, a pair of toothed driven members rotatably mounted with respect to said intermediate transmitter, a double set of engaging elements interposed between said intermediate transmitter and said toothed driven members and adapted to make positive forward and reverse driving connections between said intermediate transmitter and toothed driven members and coöperatively arranged so that relative rotative movement between said intermediate transmitter and toothed driven members operate said engaging elements into and out of positive driving relation with said toothed driven members while permitting either one of said toothed driven members to turn faster than the other in either direction while the other is being driven.

44. In mechanism of the class described, the combination of an intermediate transmitter, a pair of double pawls driven by the transmitter, and a pair of notched driven members adapted to be engaged by said pawls and mounted independently and rotatably in said intermediate transmitter and coöperating with said intermediate transmitter and pawls in such manner that said pawls are moved into engagement with said notched driven members by rotative movement of said intermediate transmitter relative to said notched driven members.

45. In mechanism of the class described, the combination of an intermediate transmitter, a pair of notched driven members rotatively mounted with respect to said intermediate transmitter, and a pair of double pawls interposed between said intermediate transmitter and notched driven members and adapted to make forward and reverse positive driving connections between said transmitter and notched driven members and coöperatively connected therewith so that relative rotative movement between said transmitter and notched driven members in either forward or reverse direction effects the operation of said pawls into and out of forward and reverse positive driving relation, respectively, to said notched driven members.

46. In mechanism of the class described, the combination of an intermediate transmitter, a pair of toothed driven members each independent of the other, a plurality of pawls interposed between each of said toothed driven members and said transmitter respectively, and having sets of teeth thereon and adapted to make forward and rearward driving connections between said transmitter and toothed driven members, means connecting said plurality of pawls coöperating with each driven member and adapted to operate them simultaneously, a lead tooth on one pawl of each of said plurality of pawls for each forward and rearward driving direction, means adapted to operate and control said pawls automatically.

47. In mechanism of the class described, the combination of a transmitting casing adapted to be mounted and power rotated in either direction, a pair of ratchet wheels independently rotatably mounted in said casing, and means including engaging devices interposed between said casing and said ratchet wheels, adapted to make forward and rearward positive driving connections between said casing and each of said ratchet wheels independently, and so connected with said casing and ratchet wheels in such a manner that the relative rotative movement between said casing and ratchet wheels operates said engaging devices into and out of forward and rearward driving engagement with said ratchet wheels, and permitting either said ratchet wheel to turn faster than the other and the casing, while being driven, as conditions require.

MELVIN A. YEAKLEY.

Witnesses:
S. S. Kurtz,
W. H. Smith.